US007126997B2

United States Patent
Cuypers et al.

(10) Patent No.: US 7,126,997 B2
(45) Date of Patent: Oct. 24, 2006

(54) MULTICARRIER RECEIVER

(75) Inventors: Gert Gaston Delphinus Cuypers, Leuven (BE); Marc Suzanne Paul Moonen, Herent (BE); Piet Vandaele, Houthulst (BE); Geert Bert Maarten Ysebaert, Winksele (BE)

(73) Assignee: ALCATEL, Paris (FR)

( * ) Notice: Subject to any disclaimer, the term of this patent is extended or adjusted under 35 U.S.C. 154(b) by 782 days.

(21) Appl. No.: 10/247,478

(22) Filed: Sep. 20, 2002

(65) Prior Publication Data

US 2003/0152156 A1 Aug. 14, 2003

(30) Foreign Application Priority Data

Sep. 21, 2001 (EP) .................................. 01440309

(51) Int. Cl.
*H04K 1/10* (2006.01)
(52) U.S. Cl. ....................................... 375/260; 375/316
(58) Field of Classification Search ................ 375/343, 375/260, 354, 350, 346, 348, 232; 370/506, 370/510; 455/59; 329/318, 349; 333/18, 333/28 R; 357/316, 260
See application file for complete search history.

(56) References Cited

U.S. PATENT DOCUMENTS

| | | | | |
|---|---|---|---|---|
| 6,014,412 A | * | 1/2000 | Wiese et al. ................. | 375/346 |
| 6,233,276 B1 | * | 5/2001 | Simeon ....................... | 375/232 |
| 6,456,673 B1 | * | 9/2002 | Wiese et al. ................. | 375/346 |
| 6,735,255 B1 | * | 5/2004 | Smart et al. ................. | 375/260 |
| 6,744,821 B1 | * | 6/2004 | Van Acker et al. ......... | 375/260 |
| 6,785,349 B1 | * | 8/2004 | Rosenlof et al. ............ | 375/343 |
| 7,058,141 B1 | * | 6/2006 | Nedic ........................... | 375/341 |
| 2002/0163983 A1 | * | 11/2002 | Redfern ...................... | 375/350 |
| 2004/0042543 A1 | * | 3/2004 | Li et al. ...................... | 375/222 |

FOREIGN PATENT DOCUMENTS

| | | |
|---|---|---|
| EP | 0 967 763 A1 | 12/1999 |
| EP | 0 969 637 A1 | 1/2000 |

OTHER PUBLICATIONS

Interference suppression in DMT receivers using windowing, Kapoor, S.; Nedic, S.; Communications, 2000. ICC 2000. 2000 IEEE International Conference on vol. 2, Jun. 18-22, 2000 pp.: 778-782 vol. 2.*

Per tone adaptive equalization in DMT receivers with selective windowing, Nedic, S.; Popovic, N.; Communications, 2001. ICC 2001. IEEE International Conference on vol. 1, Jun. 11-14, 2001 pp.: 179-183 vol. 1.*

(Continued)

*Primary Examiner*—Temesghen Ghebretinsae
(74) *Attorney, Agent, or Firm*—Sughrue Mion, PLLC

(57) ABSTRACT

A multicarrier receiver which receives a cyclically extended multicarrier symbol which is in a serial format is provided. The multicarrier receiver includes a serial to parallel converter, a window which decreases spectral side lobes of the multicarrier symbol and outputs a windowed multicarrier symbol, a difference term generating unit which generates difference terms from the multicarrier symbol in parallel format, a first Fourier transformer which fast Fourier transforms a single carrier of the windowed multicarrier symbol for all carriers of the windowed multicarrier symbol and outputs a first Fourier transformed carrier, a second Fourier transformer which fast Fourier transforms difference terms, and a per-carrier frequency domain equalizer which equalizes all frequencies by deriving necessary fast Fourier transforms utilizing linear combinations of the first fast Fourier transformed carrier, one or more non-windowed fast Fourier transformed carriers from the second Fourier transformer and the difference terms.

11 Claims, 6 Drawing Sheets

OTHER PUBLICATIONS

Removing distortion in DMT modulation caused by insufficient cyclic prefix length, Shi Wenxiao; Lin Zi; Zhang Licui;Intelligent Control and Automation, 2000. Proceedings of the 3rd World Congress on vol. 4, Jun. 28-Jul. 2, 2000 pp.: 2488-2491 vol. 4.*

Van Acker K et al: "Combination of per tone equalization and windowing in DMT-receivers" Signal Processing, Amsterdam, NL, vol. 81, No. 8, Aug. 2001, pp. 1571-1579, XP004274112.

Van Acker K et al: "Frequency domain equalization with tone grouping in DMT/ADSL-receivers" Signals, Systems, and Computers, 1999. Conference Record of the Thirty-Third Asilomar Conference on Oct. 24-27, 1999, Piscataway, NJ, USA, IEEE, US Oct. 24, 1999, pp. 1067-1070, XP010373800.

Van Acker K et al: "Per tone equalization for DMT receivers" GLOBECOM'99, 1999, pp. 2311-2315, XP010373366.

* cited by examiner

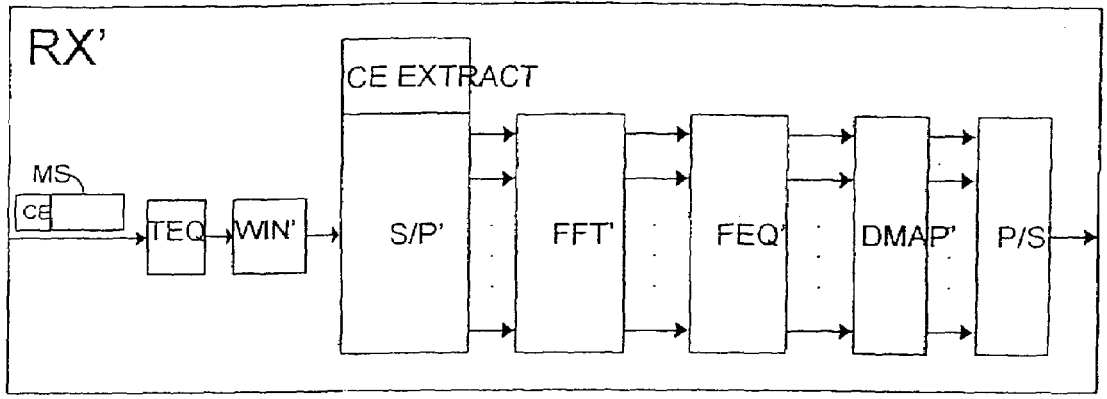
Fig. 6  RELATED ART
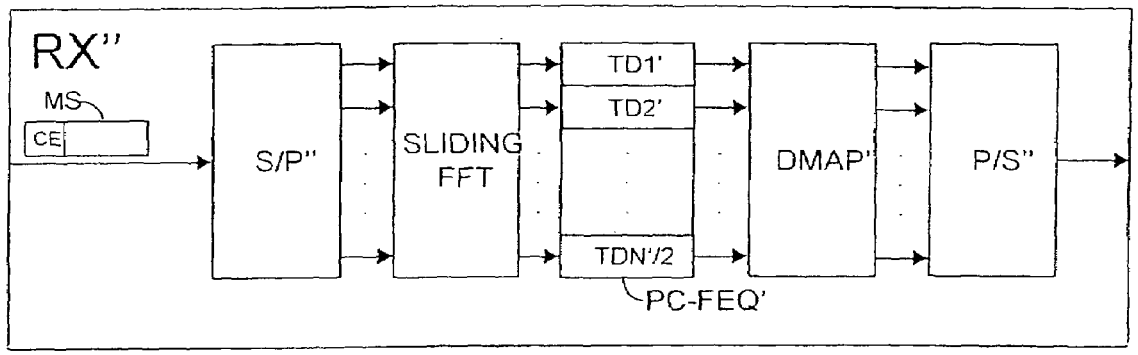
Fig. 7  RELATED ART
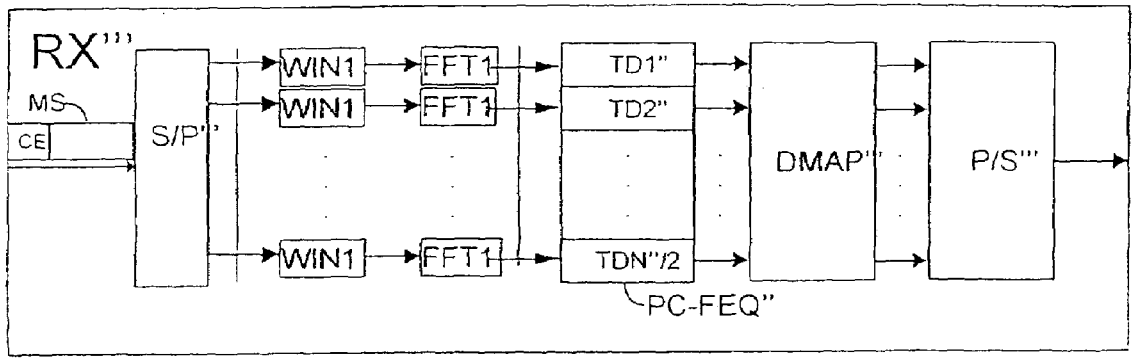
Fig. 8
RELATED ART

MULTICARRIER RECEIVER

BACKGROUND OF THE INVENTION

The invention is based on a priority application EP 01 440 309.1 which is hereby incorporated by reference. The present invention relates to a multicarrier receiver suitable to receive a sequence of cyclically extended multicarrier symbols.

DSL (Digital subscriber Line) enables high speed digital data transport over telephone lines. In some applications such as ADSL (Asymmetric Digital Subscriber Line), this is done in overlay on the analogue POTS (Plain Old Telephone Service) service. Thanks to ADSL, telephone companies can reuse most of their installed wiring for the introduction of new services. By using DMT (Discrete Multi Tone) modulation carriers with a higher signal to noise ratio (SNR) are allowed to carry more bits than carriers with a low SNR.

The effect of intersymbol and intercarrier interference due to transmission of the DMT symbols over a channel between multicarrier transmitter and multicarrier receiver can be removed by adding a cyclic extension (CE) to each DMT symbol with a length superior to the channel impulse response length. The data rate, however, reduces proportionally to the length of the cyclic prefix that is added to the DMT symbols so that the length of the cyclic extension of DMT symbols has to be limited to an acceptable number. If the channel impulse response is larger than the cyclic extension, remaining intersymbol interference (ISI) will depend on the part of the impulse response exceeding the cyclic extension length.

In order to shorten the channel's impulse response, the use of a time domain equalizer has been suggested. FIG. 6 shows a known multicarrier receiver RX' which is able to receive and demodulate multicarrier symbols MS that are cyclically extended. It is the task of the time domain equalizer TEQ to shorten the impulse response length of the channel so that it does not exceed the length of the cyclic extension CE. The time domain equalizer TEQ thereto contains a set of adaptive taps whose values are set in accordance with a mean square error (MSE) criterion. If a multicarrier symbol MS has passed the equalized channel (transmission channel+ time domain equalizer TEQ), the samples thereof are serial to parallel converted by the serial to parallel converter S/P' and the cyclic prefix extractor CE EXTRACT subtracts the cyclic extension CE from the multicarrier symbol MS so that a non-extended multicarrier symbol is applied to a Discrete Fourier Transformer (DFT), efficiently implemented as the fast Fourier transformer FFT' for time to frequency domain conversion. In the remainder of the description, the terms 'DFT' and 'FFT' will both be used. It is important to keep in mind that the FFT algorithm is merely an efficient manner to calculate a DFT, but both have the same effect. Obviously, any practical implementation will make use of the FFT. The fast fourier transformer FFT' may be preceded by a time domain window WIN', to decrease spectral leakage. The frequency domain multicarrier symbol at the output of the fast Fourier transformer FFT' is supplied to the frequency domain equalizer FEQ' which typically contains one complex tap per carrier to compensate for each carrier the phase rotation and attenuation due to transmission over the channel. For the so obtained carriers the demapper DMAP' decodes the exact amount of bits from each carrier using the appropriate constellation schemes. The bits at the output of the demapper DMAP' are serialised by the parallel to serial converter P/S'.

The time domain equalizer TEQ in a multicarrier receiver RX' with the known architecture cannot treat different carriers of the multicarrier symbol MS differently although different carriers may be differently affected by noise on the transmission channel. An improved multicarrier receiver RX" known from EP 969 637 A1 is shown in FIG. 7. The samples of the cyclically extended multicarrier symbol MS, when received by the multicarrier receiver RX", are paralleled by the serial to parallel converter S/P'" without having passed any equalizer. The extended multicarrier symbol MS then is supplied to the sliding fast Fourier transformer SLIDING FFT which converts different parts of the extended multicarrier symbol MS from time domain to frequency domain by calculating several consecutive Fourier transformations.

A complete calculation of these FFTs would be very computationally intensive. However, a sliding DFT (be it implemented by the FFT algorithm) can be derived from one DFT (FFT) and difference terms. Therefore, in practice the FFTs are replaced by one full FFT and difference terms, without sacrificing performance. The difference terms are formed as differences between incoming samples that are a distance equal to the FFT size apart.

The parts of the extended multicarrier symbol MS that are transformed (by the FFTs) all have the length of a non extended multicarrier symbol, i.e. the Fast Fourier Transform (FFT) size. The sliding fast Fourier transformer SLIDING FFT in this way calculates at most an amount of Fourier transforms equal to the number taps of the tapped delay lines TD1', TD2', . . . , TDN'/2 in the per-carrier frequency domain equalizer PC-FEQ', which is also often called per-tone equalizer. The resulting frequency domain multicarrier symbols are applied to the per-carrier frequency domain equalizer PC-FEQ'. In the per-carrier frequency domain equalizer PC-FEQ', each carrier is equalized by an individual equalizer or tapped delay line TD1', TD2', . . . , TDN'/2. The number of complex taps per tapped delay line TD1', TD2', . . . , TDN'/2 does not necessarily have to be the same for each tapped delay line TD1', TD2', . . . , TDN'/2, but could be a maximum of T taps per line. The equalized carriers at the output of the per-carrier frequency domain equalizer PC-FEQ' are applied to the demapper DMAP" which decodes the exact amount of bits from each carrier using the appropriate constellation schemes and the bits sourced by this demapper DMAP" are serialised by the parallel to serial converter P/S".

It is known that part of the cyclic extension can be used for windowing in the receiver, such as in, but not limited to a Very High Speed Digital Subscriber Line (VDSL) modem. This operation is transparent for tones that are perfectly periodic in the DFT window, but reduces the effect of transitions that would otherwise cause intersymbol and intercarrier interference. It thus helps to reduce the spectral leakage effects due to the bad spectral containment of the DFT operation. Hence, Radio Frequency Interference (RFI) and crosstalk will only affect a limited number of carriers. In order to combine the benefits of the per-tone equalization and windowing, an implementation of both in a multicarrier receiver is desirable. However the implementation of windowing and per-tone equalization would computationally be very demanding. A straightforward implementation would require the sliding DFT to be replaced by a number of successive window and DFT operations, implemented as FFTs, as shown in FIG. 8. However, the simple implementation with low computational effort (making use of the difference terms, as with the PC-FEQ') to anticipate the per tone equalization would be lost.

SUMMARY OF THE INVENTION

It is hence the object of the invention to develop a multicarrier receiver which combines the benefits of windowing and per tone equalization without unduly increasing the computational effort.

According to the invention this object is solved by a multicarrier receiver comprising the coupling of a window for applying a window function to said multicarrier symbols, a Fourier transformer, coupled to said window, and adapted to perform one windowed Fourier transform for all carriers in said windowed multicarrier symbol, a per-carrier frequency domain equalizer, coupled to said windowed Fourier transformer, and comprising a tapped delay line per carrier in said multicarrier symbol, and means for performing the equivalent to a sliding windowed Fourier transform, including a sliding Fourier transform.

In the above "windowed Fourier transform" refers to the result obtained after a window operation and a subsequent Fourier transformation.

The inventive multicarrier receiver allows equalization of all frequencies based on the outputs at these frequencies of a sliding windowed Fourier transform. The outputs of this sliding windowed Fourier transform are coupled to individual tapped delay lines per tone, comprising adaptive complex equalizers. In a straightforward implementation of the state of the art according to FIG. 8, the sliding windowed DFT is computed by calculating a number of windowed FFTs equal to the number of complex taps of said tapped delay lines. In the inventive multicarrier receiver, only one windowed DFT is performed. The others are derived as a linear combination of the first windowed DFT (FFT), an additional smaller non-windowed DFT (FFT), and a number of correction terms.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

In an embodiment of the multicarrier receiver, the window comprises means for applying a taper of length $\mu$.

As noted before, the invention aims to reduce the complexity of the computation of the sliding windowed DFT by avoiding having to calculate a large number of windowed DFTs. In fact, in the invention, only one windowed DFT needs to be computed. The other windowed DFTs can be derived from this one by means of a secondary sliding windowed DFT of difference terms. However, the outputs of any secondary windowed DFT of difference terms at each frequency can be derived from the outputs of the corresponding non-windowed DFT of difference terms at one or more frequencies, such that this secondary sliding windowed DFT of difference terms can be replaced by a secondary sliding non-windowed DFT of difference terms. Moreover, this sliding non-windowed DFT can be computed, by computing one non-windowed DFT of difference terms, whereas the others can be derived making use of (second) difference terms.

In this way, the sliding windowed DFT required originally, is replaced by one windowed DFT (FFT), one secondary non-windowed DFT (FFT) of difference terms and a number of (second) difference terms. The other windowed DFTs that are not explicitly calculated can be written as a linear combination of the aforementioned terms.

In the above, the expression "difference terms" refers to the differences between two input samples that are a distance N away from each other, N being the DFT size. The expression (second) difference terms refers to linear combinations of difference terms, weighted by complex exponentials.

In the case of randomly chosen window functions, one would need to compensate for the entire window taper with linear combinations having $2*\mu$ difference terms. In other words, when a window has a taper of length $\mu$, then one would need $2*\mu$ additional samples to match the outputs of two successive DFTs, because all 'weighted' time domain samples (with weighting different from 1) have to be 'corrected'. The proposed method replaces these $2*\mu$ samples by a number of difference terms, only related to the original tapped delay line length T, and one or more outputs of a secondary non-windowed DFT, the number of which is related to the shape of the taper.

In a preferred embodiment, this taper function is linearly sloped (subsequently referred to as 'Bartlet' implementation). In this case the number of outputs of the secondary DFT needed per tone is equal to 1 and the number of difference terms needed is $2*(T-1)$, T being the original tapped delay line length.

In an alternative implementation making use of the raised cosine window, the number of outputs of the secondary DFT needed per tone is equal to 2 and the number of difference terms needed is $2*(T-1)$.

The choice of other window functions is also possible and may lead to another number of outputs of the secondary DFT needed per tone, but will never require more than $2*(T-1)$ difference terms.

In a preferred embodiment the per-carrier frequency domain equalizer comprises means for creating tone dependent difference terms. The number of difference terms can be reduced to $(T-1)$ if one combines the difference terms in a tone-dependent fashion.

In the case of the classical per carrier equalization, see EP 969 637 A1, the sliding DFT has N nonzero elements, N being the size of the DFT. This leads to a straight-forward computationally attractive calculation method for the sliding DFT. In the present invention, however, this is no longer the case. The above mentioned secondary non-windowed DFTs of difference terms in which the original windowed DFT is transformed, only have $\mu$ nonzero elements. The elements in which two successive secondary DFTs of difference terms differ will therefore not have the same exponent for each tone, and the creation of tone independent difference terms is not possible. In case the original window had a linearly sloped taper (Bartlet implementation), tone dependent difference terms can advantageously be created. Therefore this is considered the preferred embodiment.

In general, the invention is not restricted to any particular shape of the window taper. However, in a preferred embodiment of the invention, the fourier transform of the differences of the taper of the original window function have only a few nonzero elements. This implies that, in case these differences (of the taper) are used as a window for the secondary windowed DFT of difference terms, the output of this secondary DFT can be written as a linear combination of only a few outputs of the corresponding non-windowed DFT of difference terms.

The inputs of the per tone equalizers are formed by the output of the windowed DFT (in practice implemented as an FFT) on that particular tone, a number of difference terms and one or more outputs from the secondary non-windowed DFT of difference terms that is embodied within the per-carrier frequency domain equalizer. The exact number and the position of the outputs of this secondary, non-windowed, DFT of difference terms that are used for the equalization of a particular tone, depends on the index of that tone and the type of window that is used. If in a particular embodiment a Bartlet window is used, only one output of this secondary, non-windowed DFT of difference terms is used and the index is equal to the index of the tone being equalized. If in another embodiment of the invention a raised cosine window is used, two outputs of this secondary non-windowed DFT of difference terms are used and the index of these outputs are symmetric around the tone being equalized. However, the current invention is not limited to any particular form of the window that is employed. The difference terms that are used for equalization become the difference terms of non-windowed input values which are the same for all tones. These non-windowed input values do not depend on the tone index of the tone being equalized.

The per-carrier frequency domain equalizer and the sliding windowed DFT (FFT) implementation can be combined with any adaptive or fixed equalizer coefficient computation algorithm. However, the algorithm is particularly well suited, but not restricted, to be combined with a low cost recursive least squares (RLS) implementation.

The object is further solved by a method of equalizing a multicarrier symbol in a multicarrier receiver comprising the steps of:

a) windowing the multicarrier symbol;
b) performing one fast Fourier transform for all carriers of the windowed multicarrier symbol;
c) equalizing all frequencies using the equivalent to a sliding fast Fourier transform.

It is particularly advantageous if equalization is done using a per carrier frequency domain equalizer incorporating a sliding DFT of non-windowed difference terms. The computational complexity is kept low by the particular implementation of the sliding DFT. It is computed using one DFT (implmented as FFT) of non-windowed difference terms. The other DFT's are computed using this one FFT and adding/subtracting the appropriate non-windowed difference terms.

Using this method windowing and per carrier frequency equalization can be combined without unduly increasing the computational complexity in a multicarrier receiver. Thus the benefits of windowing and equalization in the frequency domain can be combined.

The complexity of the per carrier frequency domain equalizer can be kept low, if in the implementation of the non-windowed sliding Fourier transform tone dependent difference terms are used. This is particularly advantageous if a Bartlet window is used.

A processor unit, a gate array unit and possibly a digital signal processor for supporting the above method as well as a computer program for performing the above method also lie in the scope of the present invention. The method can be realized using electronic devices, i.e. hardware, as well as in the form of a computer program, i.e. software. The implementation of the method will be obvious for a person skilled in the art.

The present invention is suitable for application in a multicarrier environment as ADSL or VDSL wherein the DMT multicarrier modulation is used. Nevertheless, applicability of the present invention is not restricted to a particular kind of transmission medium (twisted pair telephone line, coax cable, satellite link, . . . ) or to any particular layer transfer protocol (ADSL, VDSL, . . . ).

Additional distinctions and advantages of the invention can be gathered from the description of an embodiment of the invention, the drawing, which shows details relevant to the invention, and from the claims. The individual characteristics can be realised each individually or collectively in any combination in an embodiment of the invention.

BRIEF DESCRIPTION OF THE DRAWINGS

The invention is schematically shown in the drawing, such that the essential features of the invention can be easily recognised.

FIG. 6 shows a block scheme of a multicarrier receiver of the state of the art with a time domain equalizer and optional windowing;

FIG. 7 shows a block scheme of a multicarrier receiver of the state of the art with a frequency domain equalizer and a sliding Fourier transformer; but without windowing FIG. 8 shows a block scheme of a multicarrier receiver of the state of the art combining windowing and per carrier equalization;

DETAILED DESCRIPTION OF THE EXEMPLARY EMBODIMENTS

Figure 1:
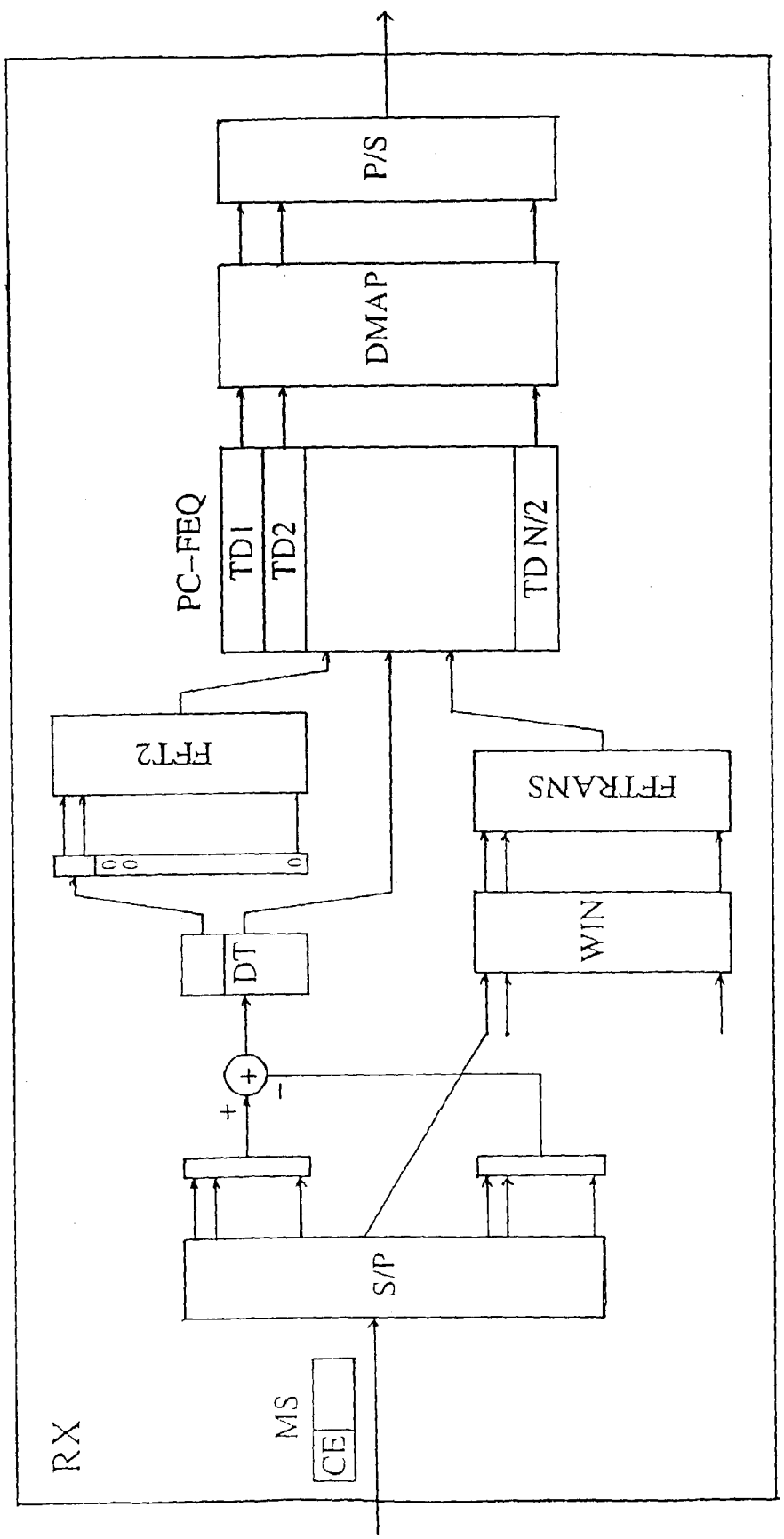
FIG. 1 shows a block scheme of an embodiment of the multicarrier receiver according to the invention.

The multicarrier receiver RX drawn in FIG. 1 includes a serial to parallel converter S/P, a window WIN, a fast Fourier transformer FFTRANS, a per-carrier frequency domain equalizer PC-FEQ, a demapper DMAP and a parallel to serial converter P/S. The per-carrier frequency domain equalizer PC-FEQ contains Nu tapped delay lines where Nu is the number of used carriers in a multicarrier symbol, which has to be less than or equal to N/2, N being the FFT size. The tapped delay lines are indicated by TD1, TD2, . . . , TDN/2 in FIG. 1.

The serial to parallel converter S/P, the window WIN, the fast Fourier transformer FFTRANS, the per-carrier frequency domain equalizer PC-FEQ, the demapper DMAP and the parallel to serial converter P/S are coupled between an input port and output port of the multicarrier receiver RX. In particular, the tapped delay lines TD1, TD2, ..., TDN/2 are coupled between respective outputs of the fast Fourier transformer FFTRANS and respective inputs of the demapper DMAP.

The samples of the cyclically extended multicarrier symbol MS, when received by the multicarrier receiver RX, are serial to parallel converted. On the last N+μ samples of this parallel data a window is applied. Windowing is used to decrease the spectral side lobes of a subsequent DFT (implemented as FFT). Limiting the window size to the DFT size N would inevitably lead to the loss of orthogonality between the carriers. Therefore the window size is extended by a length μ. The windowing operation also comprises the folding back of the head and tail of the windowed multicarrier symbol such that the symbol length equals the DFT size N. The extended multicarrier symbol MS then is supplied to the fast Fourier transformer FFTRANS which performs one FFT for all carriers of the windowed multicarrier symbol MS. The resulting frequency domain multicarrier symbols are applied to the per-carrier frequency domain equalizer PC-FEQ. In the per-carrier frequency domain equalizer PC-FEQ, each carrier is equalized by an individual equalizer or tapped delay line TD1, TD2, ..., TDN/2. In the per-carrier frequency domain equalizer PC-FEQ the FFTs necessary for equalization for each carrier are derived as linear combinations of the one windowed FFT performed in the fast Fourier transformer FFTTRANS, one or -more outputs of a secondary non-windowed FFT performed in FFT2 and some difference terms, obtained in DT, formed as linear combinations of samples of the parallel data. The taps of a tapped delay line TD1, TD2, ..., TDN/2 are adapted on the basis of a mean square error (MSE) criterion that optimises the signal to noise ratio (SNR) for transmission of that carrier over the transmission channel between multicarrier transmitter and multicarrier receiver RX. The equalized carriers at the output of the per-carrier frequency domain equalizer PC-FEQ are applied to the demapper DMAP which decodes the exact amount of bits from each carrier using the appropriate constellation schemes. The bits sourced by this demapper DMAP are serialised by the parallel to serial converter P/S.

Figure 2:
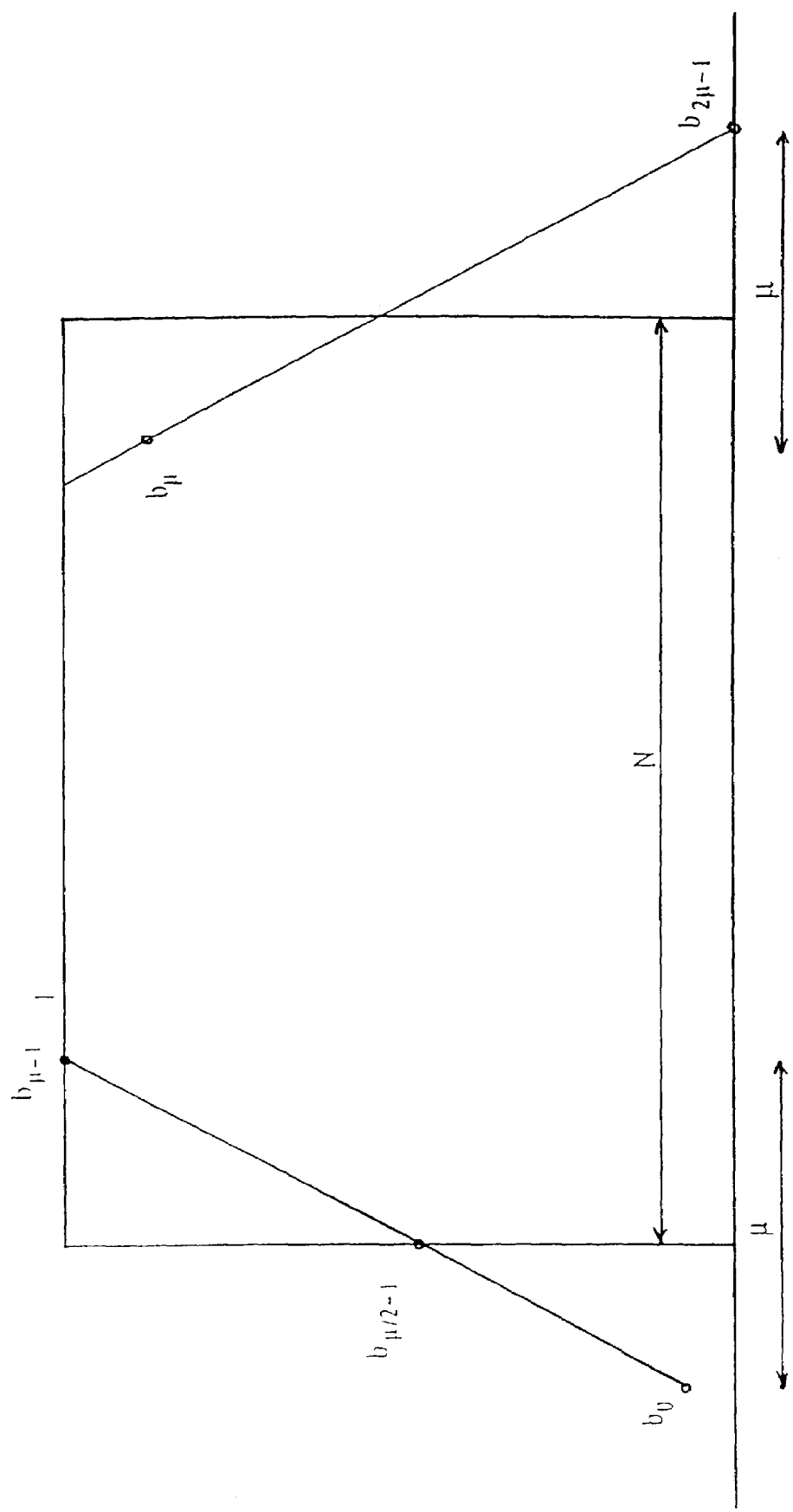
FIG. 2 shows a representation of a Bartlett window.

FIG. 2 shows a Bartlet window with N being the DFT size and μ being the length by which the window size is extended to maintain orthogonality between carriers. The Bartlet window can be represented by $$\lfloor b_0 b_1 \ldots b_{\mu-1} 1 \ldots 1 b_\mu \ldots b_{2\mu-1} \rfloor,$$

where $$b_x = \frac{x+1}{\mu}$$

for $0 \leq x \leq (\mu-1)$ and $$b_x = \frac{2\mu - x - 1}{\mu}$$

for $\mu \leq x \leq (2\mu-1)$.

For each tone i the T taps per tone equalizer $w_i$ is determined from the following cost function:

$$\min_{w_i} J(w_i) = E\left\{ \left| \overline{w}_i^T \begin{bmatrix} F_{win}(i,:) & 0 & \ldots \\ & \ddots & \ddots & \vdots \\ 0 & \ldots & F_{win}(i,:) \end{bmatrix} y^{(k)} - X_1^{(k)} \right|^2 \right\}$$

The matrix in this equation, which will further be denoted as F holds the original T windowed DFTs for one tone i which would have to be performed in a multicarrier receiver of the state of the art (see FIG. 8). The matrix F contains the elements $$F_{win}(i,:) = \lfloor b_0 b_1 \alpha_1 \ldots b_{\mu-1} \alpha_1^{\mu-1} \alpha_1^\mu \ldots \alpha_1^{N-1} \\ b_\mu \alpha_1^N \ldots b_{2\mu-1} \alpha_1^{\mu+N-1} \rfloor,$$

with $$\alpha_i = e^{\frac{-j2\pi(i-1)}{N}}$$

$X_1^{(k)}$ denotes the transmitted symbol on tone i at time k, and hence the desired output of the equalizer and $y^{(k)}$ is a column vector containing the time domain symbol that forms the input of the windowing function. Because of the particular relationship of subsequent rows in matrix F the above equation can be rewritten as:

$$\min_{w_i} J(w_i) = E\left\{ \left| \overline{v}_i^T \begin{bmatrix} D_{win_i} & 0 & \ldots & -D_{win_i} & \ldots & 0 \\ & \ddots & & & \ddots & \\ 0 & \ldots & D_{win_i} & 0 & & -D_{win_i} & 0 \\ 0 & \ldots & & & & & F_{win}(i,:) \end{bmatrix} y^{(k)} - X_i^{(k)} \right|^2 \right\}$$

In this equation, $w_i$ has been transformed into $v_1$, reflecting that the original sliding windowed DFTs are now derived from one fully calculated windowed DFT and a new set of sliding DFTs.

$D_{win_i} = \lfloor d_0 d_1 \alpha_i \ldots d_{\mu-1} \alpha_i^{\mu-} \rfloor$ are modulated differences for tone i, where $d_x = b_0$ for $x=0$ and $d_x = b_x - b_{x-1}$ for $1 \leq x \leq \mu-1$. In the case of a Bartlet window, there is a linear relationship between the b's, all $d_x$ are equal. They are equal to a scaled version of the first $\mu$ elements of the $i^{th}$ row of the DFT matrix. By further introducing difference terms $\Delta_x = (y_x^{(k)} - y_{x+N}^{(k)})$ and defining $\bar{u}_i = \bar{v}_i(1: T-1)$, one obtains:

$$\bar{u}_i^T \begin{bmatrix} D_{win_i} & \cdots & & 0 \\ & \ddots & & \\ & & \ddots & \\ 0 & & \cdots & D_{win_i} \end{bmatrix} \begin{bmatrix} \Delta_k \\ \Delta_{k+1} \\ \vdots \\ \Delta_{k+T+\mu-3} \end{bmatrix}$$

This can be extended to the full N elements:

$$\bar{u}_i^T \begin{bmatrix} \Delta_k & \Delta_{k+1} & \cdots & \Delta_{k+\mu-1} \\ \Delta_{k+1} & \Delta_{k+2} & \cdots & \Delta_{k+\mu} \\ \vdots & \vdots & & \vdots \\ \Delta_{k+T-2} & \Delta_{k+T-1} & \cdots & \Delta_{k+T+\mu-3} \end{bmatrix} O \frac{1}{\mu} [DFT(i, :)]^T$$

with DFT(i,:) the $i^{th}$ row of the DFT matrix. This is the sliding DFT which is performed in the per carrier frequency domain equalizer in FIG. 1. For each tone it is possible to derive the DFT of a certain row of the matrix with difference terms as a function of a neighboring row and difference terms. Thus, only one complete DFT has to be performed for computing the sliding fourier transform within the per-carrier frequency domain equalizer. Moreover, the input to this DFT only has a limited number of nonzero elements (equal to $\mu$) such that it can be calculated in an efficient way.

Figure 3:
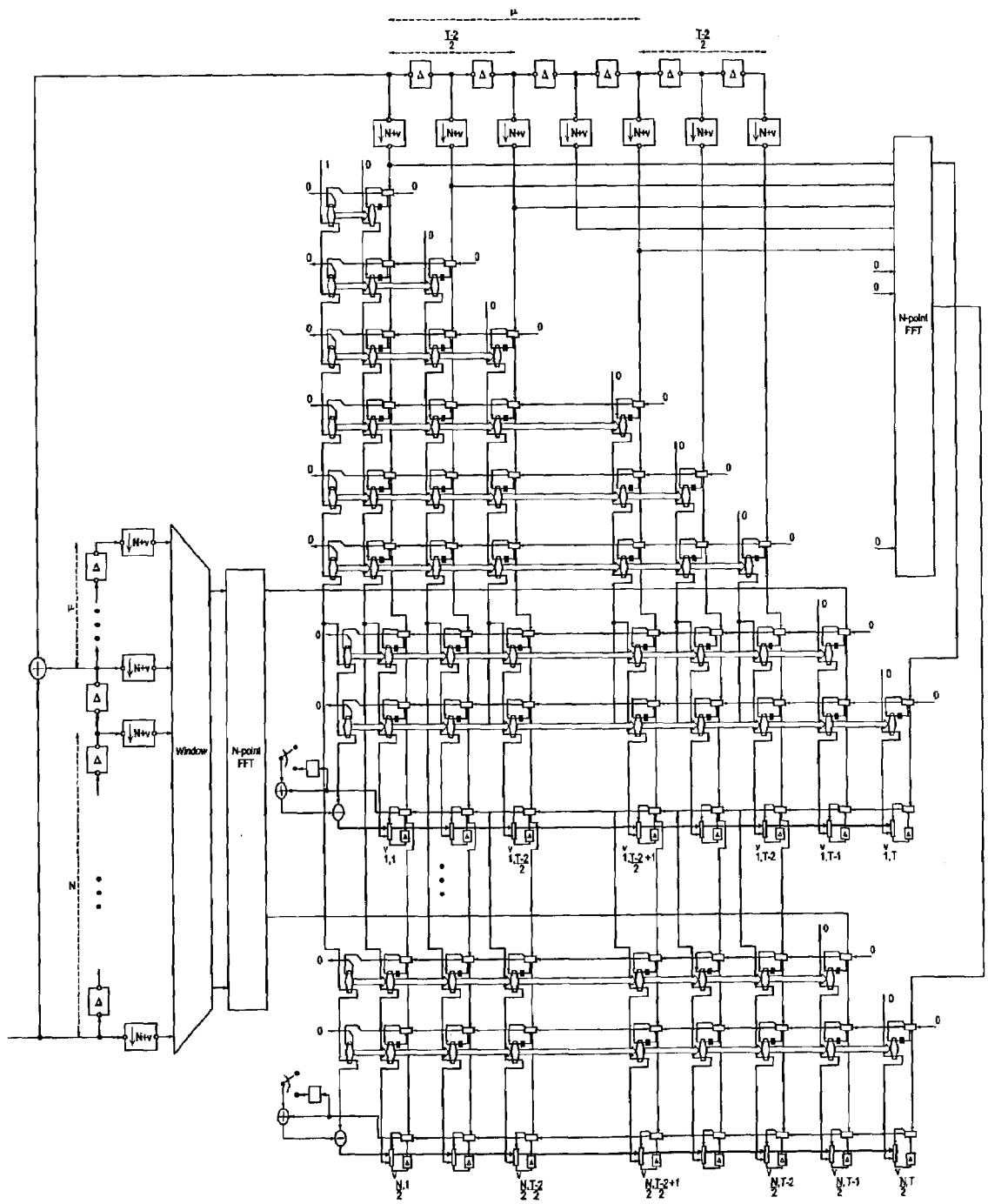
FIG. 3 shows an RLS implementation of the algorithm performed by the window, fast Fourier Transformer and per-carrier frequency domain equalizer in FIG. 1 if a Bartlett window is used.

A signal flow graph of a Recursive Least Square (RLS) implementation of the above described method is presented in FIG. 3. Note however that the adaptive method is not limited to the RLS algorithm, but could equally well be the method of Least Mean Squares (LMS) or any other suitable adaptation scheme.

Figure 4:
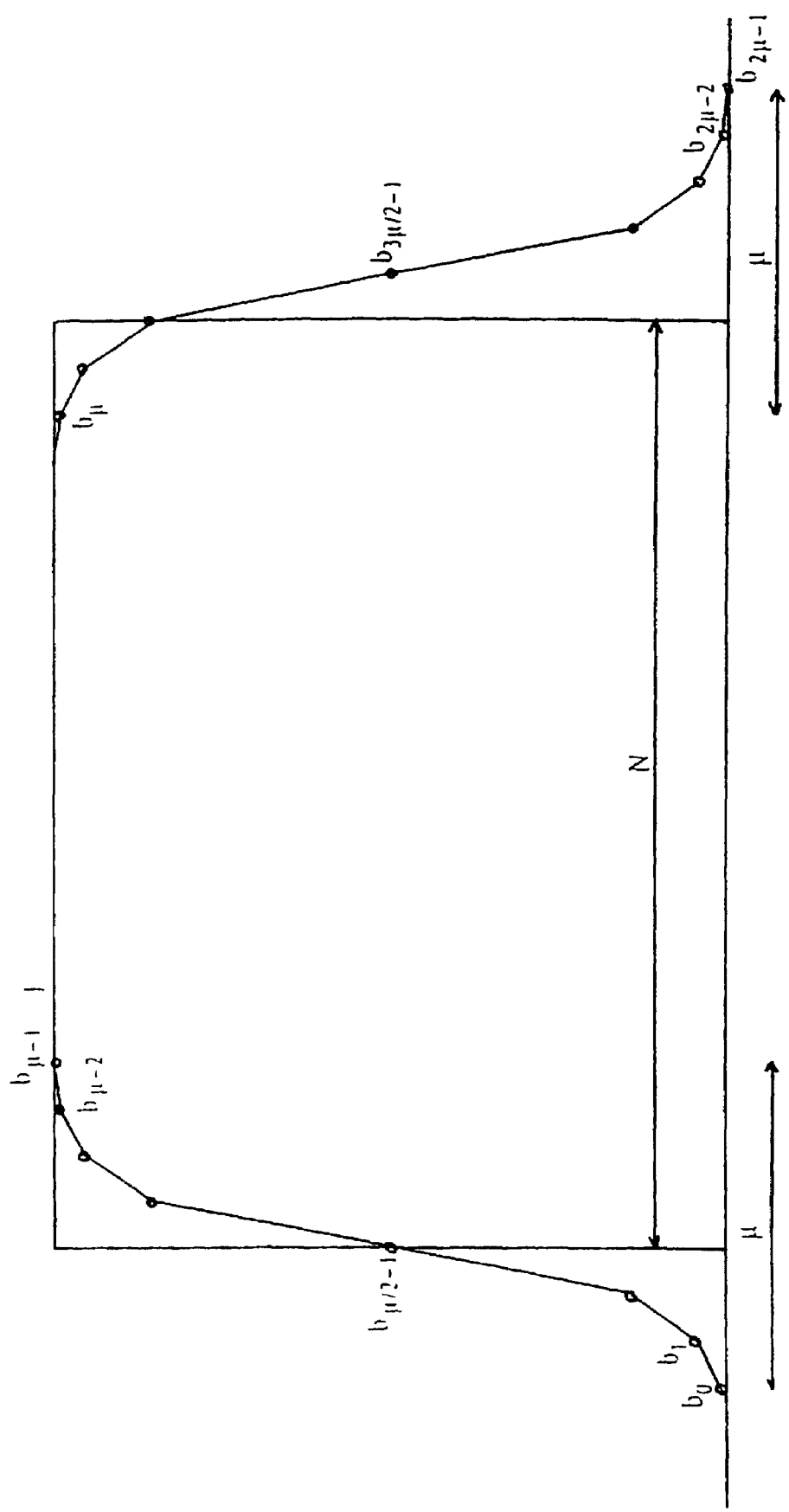
FIG. 4 shows a representation of a raised cosine window.

FIG. 4 shows a raised cosine window with N being the DFT size and $\mu$ being the length by which the window size is extended to remain orthogonality between carriers. The raised cosine window can be represented by $\lfloor b_0 b_1 \ldots b_{\mu-1} 1 \ldots 1 b_\mu \ldots b_{2\mu-1} \rfloor,$ where $$b_x = \frac{1}{2}\left(1 - \cos\left(\frac{2\pi(x+1)}{2\mu}\right)\right).$$

As is the case for the Bartlet window, $b_{\mu-1}=1$ and $b_{2\mu-1}=0$.

The derivation is identical to the Bartlet window up to the following representation:

$$\bar{u}_i^T \begin{bmatrix} D_{win_i} & \cdots & & 0 \\ & \ddots & & \\ & & \ddots & \\ 0 & & \cdots & D_{win_i} \end{bmatrix} \begin{bmatrix} \Delta_k \\ \Delta_{k+1} \\ \vdots \\ \Delta_{k+T+\mu-3} \end{bmatrix}$$

In this case the differences $D_{win}$ are no longer identical, where $D_{win} = \lfloor d_0 d_1 \ldots d_{\mu-1} \rfloor$. Instead, being the differences of a cosine function, they resemble a semiperiod of a sinoid. The above can be rewritten as:

$$D_{win_i} \begin{bmatrix} \Delta_k & \Delta_{k+1} & \cdots & \Delta_{k+T-2} \\ \Delta_{k+1} & \Delta_{k+2} & \cdots & \Delta_{k+T-1} \\ \vdots & \vdots & & \vdots \\ \Delta_{k+\mu-1} & \Delta_{k+\mu} & \cdots & \Delta_{k+T+\mu-3} \end{bmatrix} \bar{u}_i$$

At this point, only the vector $D_{win_i}$ depends on i. Extending this to other tones, yields:

$$row_i \left\{ \begin{bmatrix} D_{win_i} \\ \vdots \\ D_{win_N} \end{bmatrix} \cdot \begin{bmatrix} \Delta_k & \Delta_{k+1} & \cdots & \Delta_{k+T-2} \\ \Delta_{k+1} & \Delta_{k+2} & \cdots & \Delta_{k+T-1} \\ \vdots & \vdots & & \vdots \\ \Delta_{k+\mu-1} & \Delta_{k+\mu} & \cdots & \Delta_{k+T+\mu-3} \end{bmatrix} \right\} \bar{u}_i$$

or with $E = \text{diag}(D_{win})$ $$row_i \left\{ [DFT(N)] \begin{bmatrix} E \\ O \end{bmatrix} \cdot \begin{bmatrix} \Delta_k & \Delta_{k+1} & \cdots & \Delta_{k+T-2} \\ \Delta_{k+1} & \Delta_{k+2} & \cdots & \Delta_{k+T-1} \\ \vdots & \vdots & & \vdots \\ \Delta_{k+\mu-1} & \Delta_{k+\mu} & \cdots & \Delta_{k+T+\mu-3} \end{bmatrix} \right\} \bar{u}_i$$

By repeating the matrix E with alternating sign, and completing the matrix of difference terms with zeros, the following is obtained:

$$row_i \left\{ [DFT(N)] \begin{bmatrix} E & O & \cdots & O & O \\ O & -E & \ddots & \vdots & \vdots \\ \vdots & \ddots & \ddots & O & \\ O & \cdots & & E & O \\ O & \cdots & \cdots & O & -E \end{bmatrix} \cdot \begin{bmatrix} \Delta_k & \Delta_{k+1} & \cdots & \Delta_{k+T-2} \\ \Delta_{k+1} & \Delta_{k+2} & \cdots & \Delta_{k+T-1} \\ \vdots & \vdots & & \vdots \\ \Delta_{k+\mu-1} & \Delta_{k+\mu} & \cdots & \Delta_{k+T+\mu-3} \\ 0 & & & \\ \vdots & & & \\ 0 & & & \end{bmatrix} \right\} \bar{u}_i$$

The repetition of the differences of head/tail of the raised cosine window is sinusoidal. The product of a DFT matrix and a diagonal matrix can be written as the product of a circulant and a DFT matrix. The first row of the circulant matrix then contains the DFT of the diagonal. As the diagonal is sinusoidal, the first row of the circulant matrix contains only two (complex conjugated) non-zero elements. The position of these elements is determined by the number of repetitions of the diagonal matrix E. Hence:

$$row_i\left\{\begin{bmatrix}\ldots & a & \ldots & a^* & \ldots \\ \ldots & & a & \ldots & a^* & \ldots \\ & & & \ddots & & \ddots \\ & & & & \ddots & & \ddots \\ & a & \ldots & a^* & \ldots & & \end{bmatrix}[DFT(N)]\begin{bmatrix}\Delta_k & \Delta_{k+1} & \ldots & \Delta_{k+T-2} \\ \Delta_{k+1} & \Delta_{k+2} & \ldots & \Delta_{k+T-1} \\ \vdots & \vdots & & \vdots \\ \Delta_{k+\mu-1} & \Delta_{k+\mu} & \ldots & \Delta_{k+T+\mu-3} \\ & & 0 & \\ & & \vdots & \\ & & 0 & \end{bmatrix}\right\}\overline{u}_i$$

Each tone i is thus equalized using the $i^{th}$ output of the windowed DFT, the combination of a DFT of difference terms, on two tones, cyclically symmetric around tone i and a number of difference terms. Thus only one complete non-windowed DFT is performed for computing the non-windowed sliding fourier transform within the per-carrier frequency domain equalizer.

Figure 5:
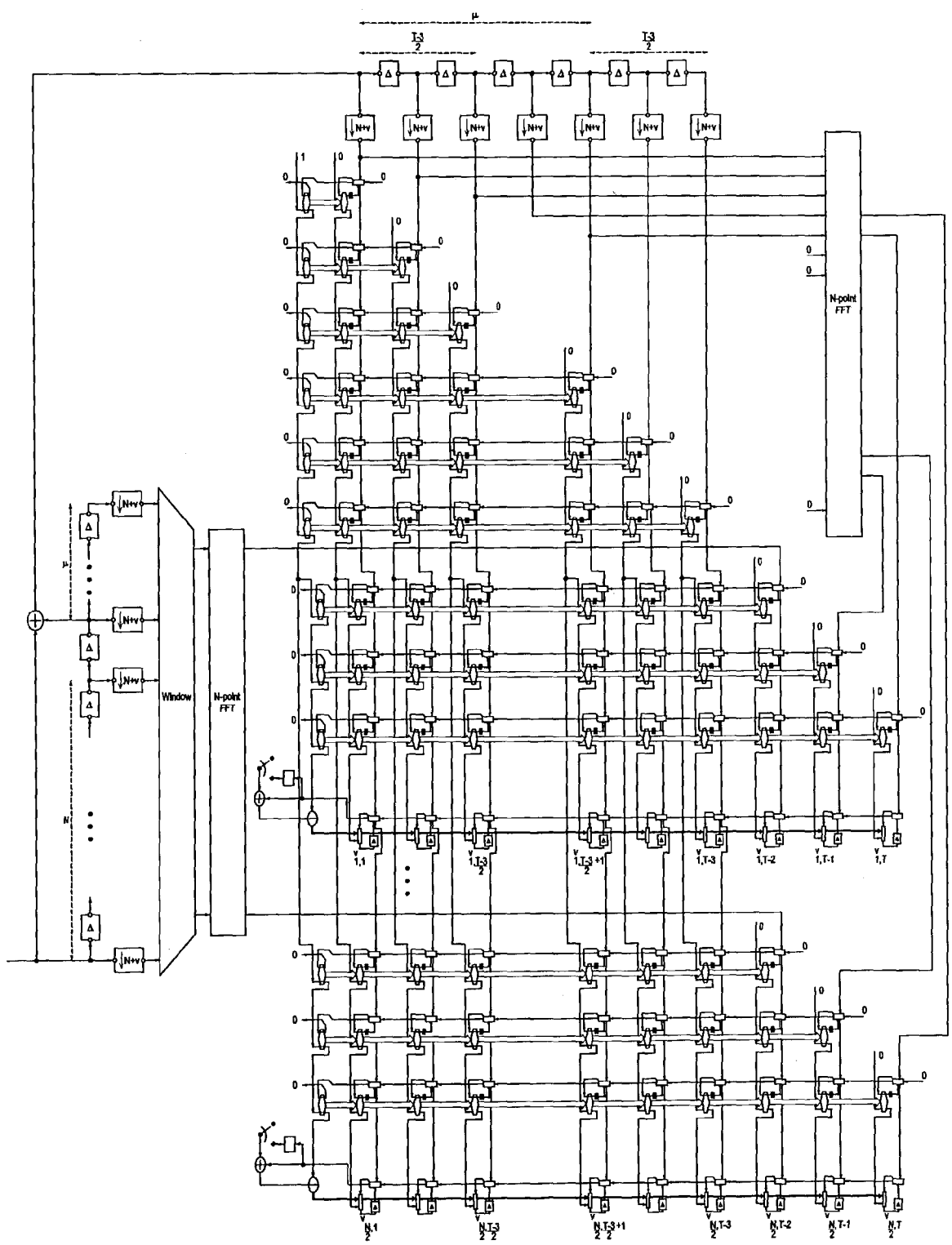
FIG. 5 shows an RLS implementation of the algorithm performed by the window, fast Fourier Transformer and per-carrier frequency domain equalizer in FIG. 1 if a raised cosine window is used.

A signal flow graph of an RLS implementation of this method using the raised cosine window is shown in FIG. 5. Again, the method of adaptation is not limited to the RLS algorithm, but could equally well be the LMS algorithm or any other suitable adaptive method.

The invention claimed is:

1. A multicarrier receiver which receives a sequence of cyclically extended multicarrier symbols, said multicarrier receiver comprising:
   a) a window which decreases spectral side lobes of said multicarrier symbols and outputs a windowed multicarrier symbol;
   b) a Fourier transformer, coupled to said window, which Fourier transforms one windowed carrier of the windowed multicarrier symbol for all carriers in said windowed multicarrier symbol;
   c) a per-carrier frequency domain equalizer, coupled to said Fourier transformer and comprising a tapped delay line for each carrier in said multicarrier symbol; and
   d) a means for performing a sliding Fourier transform, which Fourier transforms difference terms of the carriers of the multicarrier symbol and outputs the Fourier transformed difference terms to the per-carrier frequency domain equalizer.

2. The multicarrier receiver according to claim 1, wherein the means for performing sliding Fourier transform comprises a secondary Fourier transformer which Fourier transforms the difference terms of the carriers of the multicarrier symbol.

3. The multicarrier receiver according to claim 1, wherein the window comprises a means for applying a taper of length μ.

4. The multicarrier receiver according to claim 3, wherein the taper is one of linearly sloped and sinusoidal.

5. The multicarrier receiver according to claim 1, wherein the per-carrier frequency domain equalizer comprises a means for creating tone dependent difference terms.

6. The multicarrier receiver according to claim 1, wherein the means for performing the sliding Fourier transform comprises a means for weighting and converting a secondary Fourier transform to a non-weighted Fourier transform and a set of non-weighted difference terms.

7. A method of equalizing a multicarrier symbol in a multicamer receiver comprising:
   a) windowing the multicarrier symbol to decrease spectral side lobes of the multicarrier symbol;
   b) performing a single fast Fourier transform for all carriers of the windowed multicarrier symbol; and
   c) equalizing all frequencies using a sliding fast Fourier transform.

8. The method according to claim 7, wherein the sliding Fourier transform utilizes tone dependent difference terms.

9. A computer program product compnsing a computer readable storage medium having a computer program encoded theron, the computer program comprising:
   a) program instructions for windowing the multicarrier symbol to decrease spectral side lobes of the multicarrier symbol;
   b) program instructions for performing a single fast Fourier transform for all carriers of the windowed multicarrier symbol; and
   c) program instructions for eciualizing all freciuencies using a sliding fast Fourier transform.

10. A multicarrier receiver which receives a cyclically extended multicarrier symbol which is in a serial format, said multicarrier receiver comprising:
   a serial to parallel converter which converts the multicarrier symbol into a parallel format and outputs the converted multicarrier symbol in parallel format;
   a window which is coupled to the serial to parallel converter and decreases spectral side lobes of the multicarrier symbol and outputs a windowed multicarrier symbol;
   a difference term generating unit which is coupled to the serial to parallel converter and generates difference terms from the multicarrier symbol in parallel format;
   a first Fourier transformer which is coupled to the window and fast Fourier transforms a single carrier of the windowed multicarrier symbol for all carriers of the windowed multicarrier symbol and outputs a first Fourier transformed carrier;

a second Fourier transformer which is coupled to the difference term generating unit and fast Fourier transforms difference terms generated from the difference term generating unit;

a per-carrier frequency domain equalizer which is coupled to the first and second Fourier transformers and comprises a tapped delay line for each carrier in the multicarrier symbol, wherein the per-carrier frequency domain equalizer equalizes all frequencies by deriving necessary fast Fourier transforms utilizing linear combinations of the first fast Fourier transformed carrier, one or more non-windowed fast Fourier transformed carriers from the second Fourier transformer and the difference terms;

a demapper which decodes an exact amount of bits from the tapped delay line for each carrier in the per-carrier frequency domain equalizer;

a parallel to serial converter which converts the multicarrier symbol in parallel format output from the demapper into a serial format, and outputs the converted multicarrier symbol in serial format.

11. A method of equalizing a multicarrier symbol in a multicarrier receiver comprising:

converting the multicarrier symbol in a serial format to parallel format;

windowing the converted multicarrier symbol to decrease spectral side lobes of the multicarrier symbol and output windowed carriers;

generating difference terms from the converted multicarrier symbol;

first fast Fourier transforming a single carrier of the windowed carriers;

second fast Fourier transforming the difference terms;

equalizing all frequencies by deriving necessary fast Fourier transforms utilizing linear combinations of the first fast Fourier transforming a single carrier of the windowed carriers, the second fast Fourier transforming the difference terms and difference terms;

demapping to decode an exact amount of bits from equalizing all frequencies;

converting the multicarrier symbol in a parallel format to serial format.

* * * * *